Figure 1:
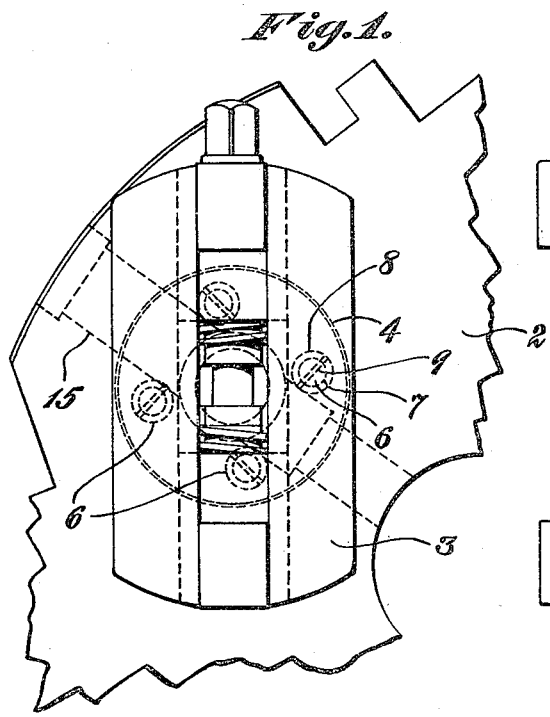

R. S. BROWN.
TURRET FOR METAL WORKING MACHINES.
APPLICATION FILED APR. 6, 1914.

1,125,054.  Patented Jan. 19, 1915.

Witnesses:
L. P. Markel
W. G. Hayes

Inventor:
R. S. Brown
By his Attorneys,
Sutherland & Henderson

UNITED STATES PATENT OFFICE.

ROBERT S. BROWN, OF NEW BRITAIN, CONNECTICUT, ASSIGNOR TO THE NEW BRITAIN MACHINE COMPANY, OF NEW BRITAIN, CONNECTICUT, A CORPORATION OF CONNECTICUT.

TURRET FOR METAL-WORKING MACHINES.

1,125,054.  Specification of Letters Patent.  Patented Jan. 19, 1915.

Application filed April 6, 1914. Serial No. 829,729.

*To all whom it may concern:*

Be it known that I, ROBERT S. BROWN, a citizen of the United States, residing at New Britain, in the county of Hartford and State of Connecticut, have invented certain new and useful Improvements in Turrets for Metal-Working Machines, of which the following is a specification.

This invention relates to turrets for metal working machines, the object of the invention being the provision of means of a simple and effective character by which the cost of production of certain classes of work can be materially reduced.

At the present time with certain kinds of work, it is imperative so far as I am aware, to utilize two automatic or semi-automatic screw-machines, the turret of one of these machines being equipped with means for supporting one kind of work, and the turret of the other machine being provided with means for carrying different kind of work. By virtue of my improved organization I avoid the use of two machines in this particular field and thereby save the expense of carrying two of such machines as a part of shop equipment, to obtain the products in question.

In the drawings accompanying and forming part of the present specification I have shown in detail one of the several convenient forms of embodiment of the invention, which to enable those skilled in the art to practice the same will be set forth fully in the following description. I do not restrict myself to this disclosure; I may depart therefrom in several respects within the scope of the invention defined by the claims following said description.

Figure 2:
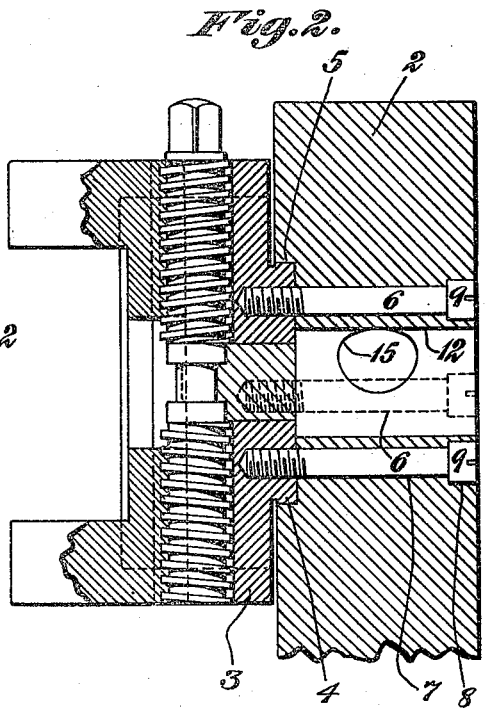
Figure 3:
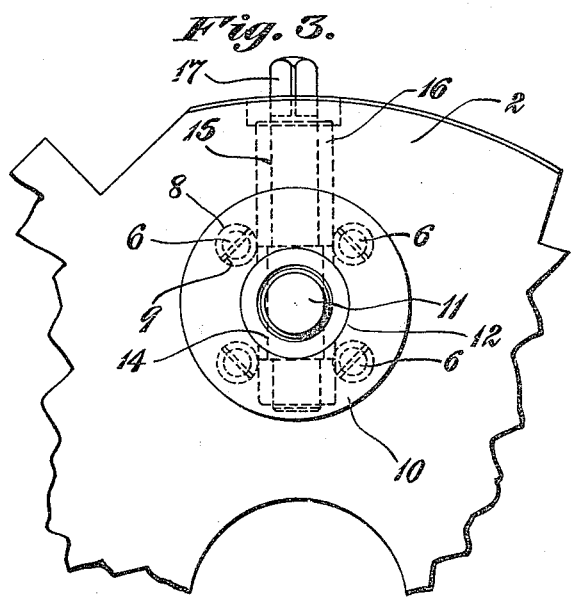
Figure 4:
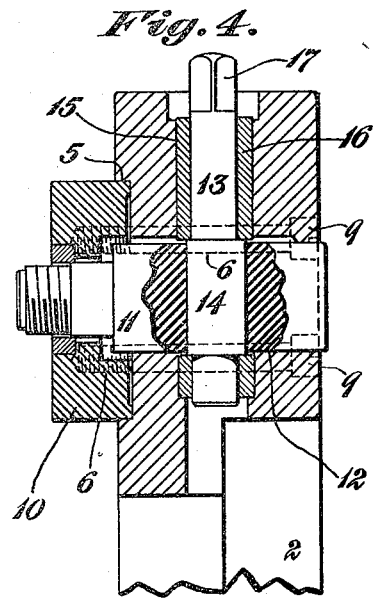

Referring to said drawings: Figure 1 is a front elevation of portion of a turret provided with means for holding one kind of work. Fig. 2 is a vertical sectional view of the same. Figs. 3 and 4 are views corresponding with Figs. 1 and 2 of the same turret but furnished with means for sustaining work of a different kind.

Like characters refer to like parts throughout the several figures of the drawings.

There are certain types of work which in a turret or screw machine require that tools operate upon the inside and outside of the same and the means for holding the two kinds of work vary, the result being that heretofore so far as I know it has been usual to provide the turret of one machine with means such as a series of chucks, for holding work that necessitates interior operations while the turret of the other machine is equipped with means such as a plurality of face plates, for holding work which is to be operated upon exteriorly. When I speak of different classes of work I intend to imply not different pieces of work but different characters which in the present case means work that is operated upon both interiorly and exteriorly at different times.

In the several views the numeral 2 designates a turret or its equivalent by which I mean to infer that the part thus denoted may be either rotary about an axis or stationary, the invention not concerning this aspect of the case. In Figs. 1 and 2 a chuck 3 is shown. This chuck is of a familiar type and therefore requires no detailed description. One of a radically different form might be substituted for it. In a turret, however, there will be means for supporting simultaneously several of these chucks 3 which are arranged at approximately equal distances apart on the front or inner side of the turret 2. The chuck 3 is shown having on its back the substantially cylindrical extension 4 to fit comparatively closely the cylindrical counterbore 5 in the front face of the turret 2 in order to steady the same, although this is not the means I rely on for removably holding the chuck 3 in place. This holding means may be of any desirable character, for instance several screws as 6 projecting through bores 7 opening at their forward ends into the counterbore 5 and having at their rear counterbores 8 to receive the heads 9 of the screws 6 which fit threaded openings in the rear of the chuck 3.

The foregoing is a brief description of one means for holding a chuck in place; the other chucks may be held to the turret in similar fashion or otherwise. To dismount a chuck or chucks it is simply necessary to remove the holding screws 6.

Referring now to Figs. 3 and 4. The numeral 10 denotes a face plate of common form and such as is used for sustaining work which is to be operated upon exteriorly and which is provided with the usual adjuncts, among which is the rearwardly extending spindle 11 adapted to project through the enlarged bore 12 which opens at its rear into the back face of the turret 2 and at its front into the counterbore 5, which counterbore it will be remembered is intersected by the screw holes or bores 7. The inner portion of the body of the face plate 10 fits snugly the counterbore 5 merely to steady said face plate, other means such as the cam bolt 13 being provided to rigidly clamp the face plate 10 in position. The spindle 11 has a transverse opening to receive the cam portion 14 of the cam-bolt 13, the shank of which extends through and out of an opening 15 radial to the bore 12, a bushing 16 being interposed between the shank of said clamping bolt 13 and the portion of small diameter of the opening 15. The clamping bolt 13 has a polygonal head 17 located partly within the enlarged portion of the opening 15 and extending the balance therefrom, so as to be accessible by a wrench to set the locking-bolt 13. Other means of an entirely different kind might be employed for holding the face-plate in position, and it will be obvious that in the case of a turret there will be several of such face plates.

It will be assumed that there are several chucks as 3 mounted upon the turret 2 and that it is necessary to dismount the same. To accomplish this the screws 6 are taken from place, this being all that is necessary. To mount the face plates 10, the spindles 11 are passed through the bores 12 and the inner portions of the bodies of the face plates are mounted in the counterbore 5 which formerly accommodated the central bosses 4. The bolts 13 are then passed through the appropriate transverse openings in the spindles 11 and are then set up to firmly clamp the face plates 10 in position.

What I claim is:

1. A turret having holes for the passage of screws to fasten a chuck in place, a spindle-receiving bore in parallelism with said screw holes, and an opening to receive a cam clamping device, radial to and opening into said spindle-receiving bore.

2. A turret having in its face a counterbore, holes therethrough for the passage of screws to fasten a chuck in place, said holes opening into said counterbore, a spindle receiving bore in parallelism with said screw holes and also opening into said counterbore, and an opening to receive a cam clamping device, radial to and opening into said spindle receiving bore.

In testimony whereof I affix my signature in presence of two witnesses.

ROBERT S. BROWN.

Witnesses:
ALICE J. FITZGERALD,
ROBERT T. FRISBIE.

Copies of this patent may be obtained for five cents each, by addressing the "Commissioner of Patents, Washington, D. C."